(12) United States Patent
Magee et al.

(10) Patent No.: US 9,411,650 B2
(45) Date of Patent: **\*Aug. 9, 2016**

(54) LEDGER-BASED RESOURCE TRACKING

(71) Applicant: Apple Inc., Cupertino, CA (US)

(72) Inventors: James Michael Magee, Orlando, FL (US); Nils A. Nieuwejaar, Belmont, CA (US); Umesh S. Vaishampayan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,288

(22) Filed: Jul. 27, 2015

(65) Prior Publication Data

US 2015/0363233 A1    Dec. 17, 2015

Related U.S. Application Data

(63) Continuation of application No. 13/604,527, filed on Sep. 5, 2012, now Pat. No. 9,123,010.

(60) Provisional application No. 61/655,968, filed on Jun. 5, 2012.

(51) Int. Cl.
*G06F 9/46* (2006.01)
*G06F 9/50* (2006.01)
*G06Q 10/06* (2012.01)

(52) U.S. Cl.
CPC ............ *G06F 9/5011* (2013.01); *G06F 9/5016* (2013.01); *G06F 9/5027* (2013.01); *G06Q 10/06313* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 6,687,735 B1 * | 2/2004 | Logston | ................... | G06F 8/64 370/486 |
| 6,941,341 B2 * | 9/2005 | Logston | ................... | G06F 8/64 709/203 |
| 7,703,102 B1 * | 4/2010 | Eppstein | ............. | H04L 41/0896 709/220 |
| 7,761,591 B2 | 7/2010 | Graham | | |
| 7,770,173 B2 | 8/2010 | Farrell et al. | | |
| 8,046,466 B2 | 10/2011 | Sutou | | |
| 8,146,079 B2 | 3/2012 | Gupta et al. | | |
| 8,234,650 B1 * | 7/2012 | Eppstein | ............... | G06F 9/5072 709/220 |
| 2006/0174247 A1 | 8/2006 | Farrell et al. | | |
| 2010/0010939 A1 | 1/2010 | Arfin et al. | | |
| 2011/0138034 A1 | 6/2011 | Brookbanks et al. | | |

\* cited by examiner

*Primary Examiner* — Van Nguyen
(74) *Attorney, Agent, or Firm* — Downey Brand LLP

(57) ABSTRACT

Disclosed are systems, methods, and non-transitory computer-readable storage media for tracking and managing resource usage through a ledger feature that can trigger complex real-time reactions. The resource tracking can be managed through a ledger module and a ledger data structure. The ledger data structure can be updated each time a task requests a resource. Additionally, as part of the update, the ledger module can verify whether a resource has been over consumed. In response to the detection of an over consumption, the ledger module can set a flag. At some later pointer when the thread is in a stable, well-understood point, the ledger module can check if the flag has been set. If the flag has been set, the ledger module can call the appropriate callback function, which can react to the over consumption in a resource specific manner.

20 Claims, 17 Drawing Sheets

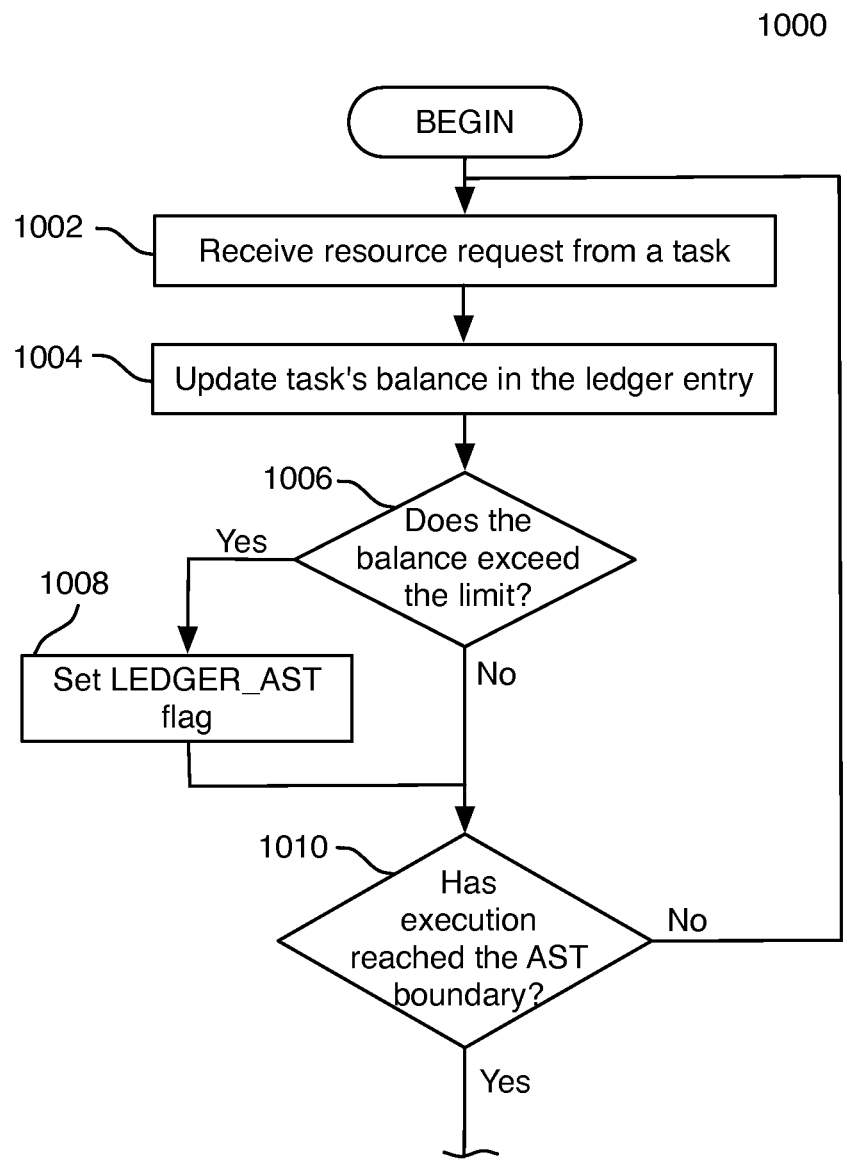

LEDGER-BASED RESOURCE TRACKING

CROSS REFERENCE TO RELATED APPLICATIONS

This application is a Continuation of U.S. patent application Ser. No. 13/604,527, entitled "LEDGER-BASED RESOURCE TRACKING," filed on Sep. 5, 2012, now U.S. Pat. No. 9,123,010, which in turn, claims the benefit of U.S. Provisional Patent Application No. 61/655,968, entitled "LEDGER-BASED RESOURCE TRACKING", filed on Jun. 5, 2012, which is hereby expressly incorporated by reference in its entirety.

BACKGROUND

1. Technical Field

The present disclosure relates to tracking and managing usage of resources consumed by processes and, more specifically, to tracking and managing resource usage through a ledger process that can trigger complex real-time reactions.

2. Introduction

Resource usage tracking is a feature common to many operating systems. These accounting systems can keep track of a variety of information, such as a process identifier, an elapsed time, and/or a number of blocks of I/O the process performed. However, these accounting features are designed to record the resources consumed by a process after the fact. Furthermore, the accounting features must be enabled explicitly. Therefore, if the system is not instructed ahead of time to track resource usage, accounting information will not be available. The requirement to enable resource usage tracking can be a significant drawback in situations where a system has exhibited poor performance for a period of time and a user or a process within the system wants to investigate but the resource tracking feature had not been enabled.

Additionally, many operating systems include features for controlling or limiting the consumption of resources. For example, the Unix system call setrlimit can be used to set a variety of limits including the amount of memory a process consumes, the number of files a process can have open, or the amount of CPU a process can consume. However, the set of resources that can be controlled are limited, and cannot be extended.

In operating systems that include resource consumption controlling features, when a process attempts to exceed a specified limit, the system will respond by sending the process a signal. The specific signal may depend on the resource being consumed, but in most cases the signal is a SIGSEGV. While it is theoretically possible to recover from this type of failure, it is sufficiently impractical that most processes are not able do so. Therefore, any failed allocation of a limited resource will result in the immediate death of the application.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for tracking and managing resource usage through a ledger feature that can trigger complex real-time reactions. The ledger feature addresses the limitations of resource tracking and consumption controlling features found in many operating systems. The ledger feature can be designed to have a low overhead, enable centralized decision making, and to be actionable and extensible. The resource tracking can be managed through a ledger data structure that includes a ledger template, one or more ledger objects, and one or more ledger entries objects. The ledger template can include an entry for each resource registered for tracking, where each entry includes, at least, a unique identifier for the registered resource and a pointer to a callback function specific to the resource. The ledger feature can include a single or a minimum number of ledger templates so as to minimize the memory footprint of the ledger feature. New entries can be added to the ledger template at any time. However, in some cases, once an entry has been added it cannot be removed.

Each task and its associated threads can be associated with a ledger object. The ledger object can include, at least, a pointer to the ledger template and a pointer to a ledger entries object. The ledger entries object can be an array of entries where each entry tracks the consumption of a particular resource by the task and/or its associated threads. In some cases, the number of entries in a task's ledger entries object can remain constant. Furthermore, the number of entries can match the number of entries in the ledger template at the time the ledger was created. If a new resource is registered for tracking after the task is created, that resource will not be added to the task's ledger entries object, which means that the resource will not be tracked for that task.

Each entry in a ledgers entries object can contain a balance and a limit. The balance represents the current consumption level. The ledger feature can support different types of entries including declining and double-entry. A declining entry includes a single value representing the current resource consumption level. A double-entry entry tracks allocations and deallocations independently. Therefore, in a double-entry entry the balance is calculated on demand based on the allocation and deallocation values.

When a resource allocation or deallocation occurs, the ledger feature can update the task's consumption balance appropriately. Additionally, as part of the update, the ledger feature can compare the balance against any limit set for the resource entry. If the limit has been exceeded, the ledger feature can set a flag, such as the LEDGER_AST bit in the thread structure. At a later point, just prior to the thread returning to user space, the ledger feature can check if the special flag, e.g. LEDGER_AST bit, was set at any time while the thread was in kernel mode. In some cases, this can occur as the thread passes through the Asynchronous System Trap (AST) boundary. If the flag is set, the ledger feature can examine each entry in the task's ledger entries object to identify the resources that were over consumed.

When the ledger feature detects that a limit has been exceeded, the ledger feature can call the associated callback function identified in the ledger template. The callback function can be a resource specific function designed to react to the resource over consumption in a manner that is appropriate for the specific resource.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved tracking and managing of resource usage by processes within a system. Using the presently disclosed technology it is possible to track resource usage and trigger complex real-time reactions when resource usage exceeds a predefined limit. The disclosure first sets forth a discussion of a basic general purpose system or computing device in FIG. 1 that can be employed to practice the concepts disclosed herein before returning to a more detailed description of tracking and managing resource usage.

Figure 1:
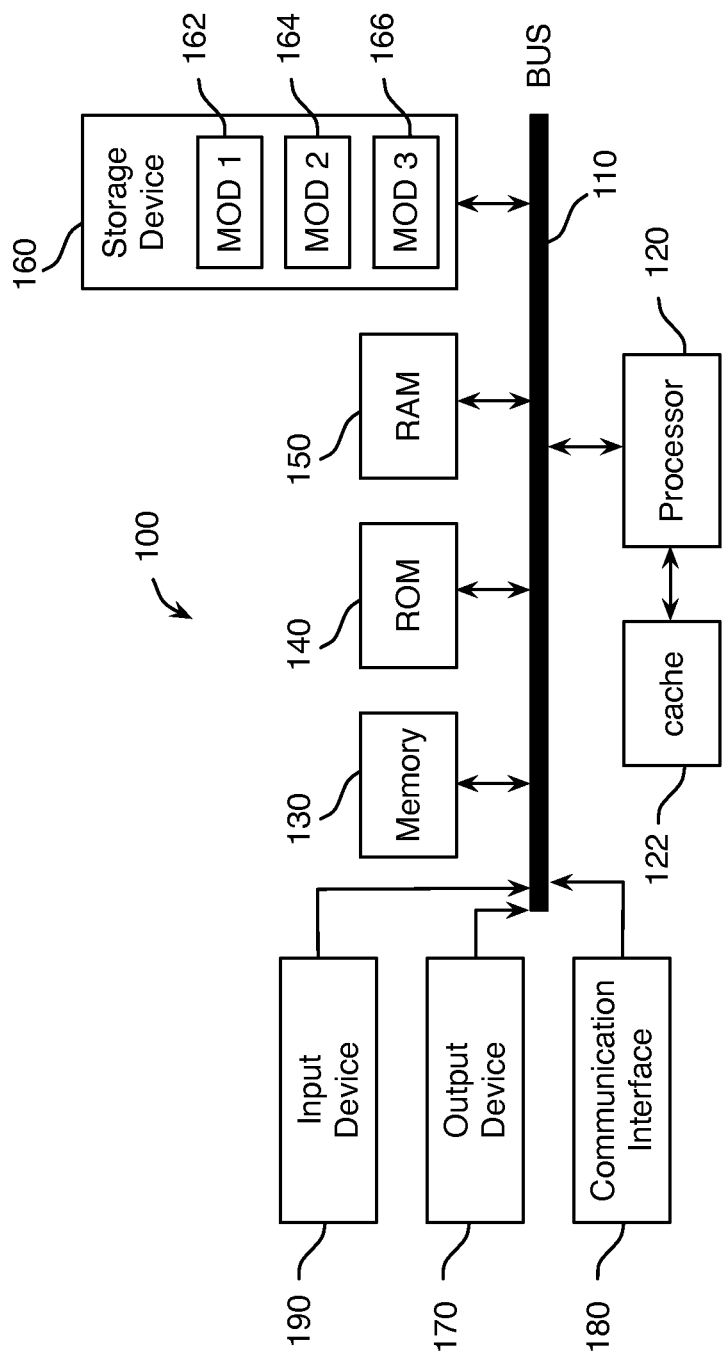
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, output device 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
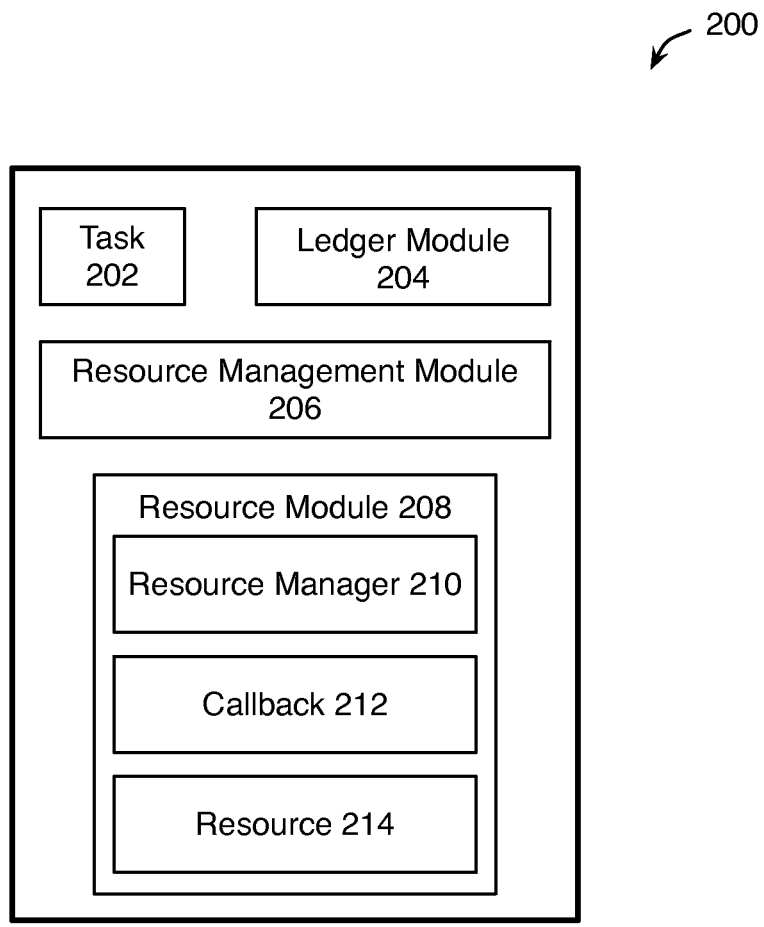
FIG. 2 illustrates an exemplary system configuration for tracking and managing resource consumption.

Having disclosed some components of a computing system, the disclosure now turns to FIG. 2, which illustrates an exemplary system configuration for tracking and managing resource consumption, such as a general-purpose computing device like system 100 in FIG. 1. Exemplary system configuration 200 can be any computing system in which tasks, such as user applications, consume computing resources, e.g. CPU cycles or memory. For example, system configuration 200 can be a client device, such as a desktop computer; mobile computer; handheld communications device, e.g. mobile phone, smart phone, tablet; smart television; set-top box; and/or any other computing device.

System 200 can include one or more tasks 202. A task 202 can be any process that consumes system resources. For example, a task 202 can be a user space application, such as a word processing program, a game, a mail application, a calendar application, a media player application, etc. System 200 can also include a resource management module 206, which can receive resource requests from a task 202. In some configurations, the resource management module 206 can be an operating system scheduler. A resource request can be an allocation and/or a deallocation request, such as a request to allocate or deallocate memory. Requests to allocate and/or deallocate additional resource types are also possible, such as disk I/O, network I/O, Mach ports, CPU cycles, etc. When a task 202 needs a resource to carry out the task's prescribed job, the task 202 can request the resource from the resource management module 206. Furthermore, when the task 202 no longer requires the resource, the task 202 can make a request to the resource management module 206 to free the resource.

System 200 can further include one or more resource modules 208. In some cases, the system 200 can include a resource module 208 for each resource type. For example, System 200 can include a resource module 208 for each of CPU cycles, memory, disk I/O, network I/O, and/or Mach ports. A resource module 208 can include at least three items: a resource manager 210, a callback 212, and the actual resource 214. In some configurations, a resource module 208 can include additional items as well. The resource manager 210 can be responsible for the actual allocation and deallocation of the particular resource 214. Additionally, the resource manager 210 can communicate with the ledger module 204 to request an update to the consumption records. A resource manager 210 can receive an allocation and/or deallocation request from the resource management module 206. As will be described in greater detail below, the callback 212 is resource-specific functionality that can be invoked upon the detection of a task exceeding the task's predefined resource consumption limit.

Figure 3:
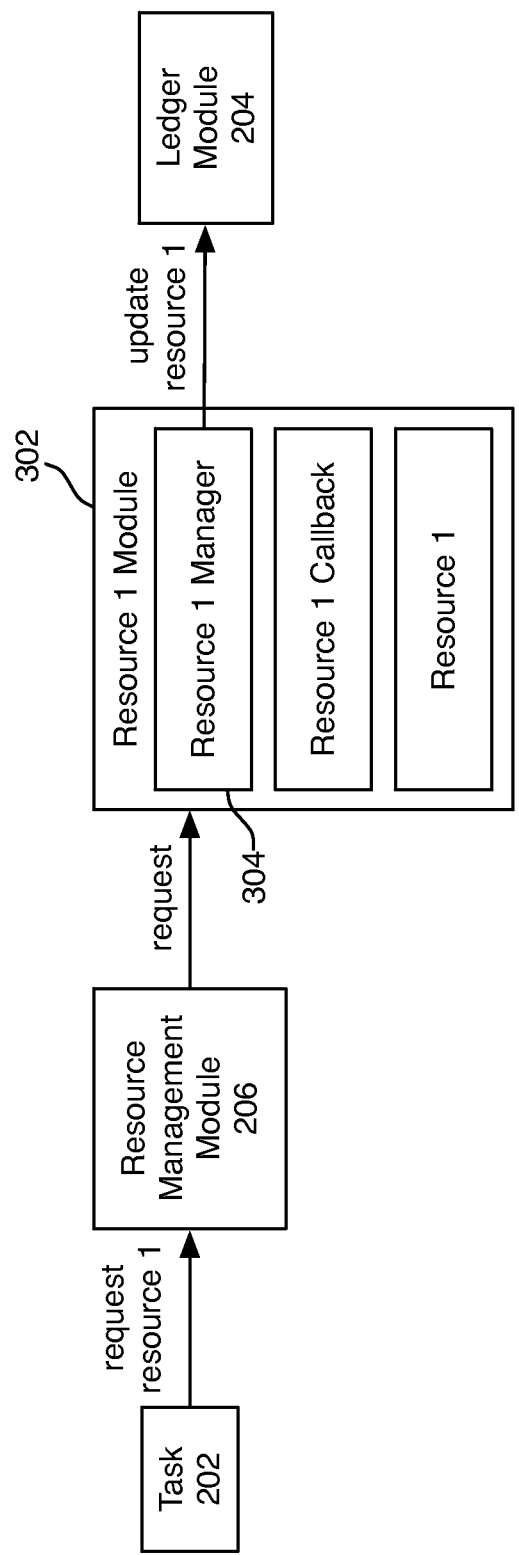
FIG. 3 illustrates an exemplary resource request.

As mentioned above, system 200 can additionally include a ledger module 204. The ledger module 204 is a facility for tracking and reacting to resource consumption. When a resource is allocated or freed, the resource's resource manager 210 can communicate with the ledger module 204 to update a task's resource consumption balance appropriately. For example, FIG. 3 illustrates an exemplary resource request. Task 202 can request a resource from the resource management module 206. At some point after receiving the request, the resource management module 206 can identify the resource module that corresponds to the requested resource and forward the resource request to that resource module. In this example, the task made a request for a resource of type resource 1. Therefore, the resource management module 206 identifies the resource module 302 for resource 1. After receiving the request, the resource manager 304 for resource 1 can request the ledger module 204 to update the resource 1 consumption balance for task 202.

Figure 4:
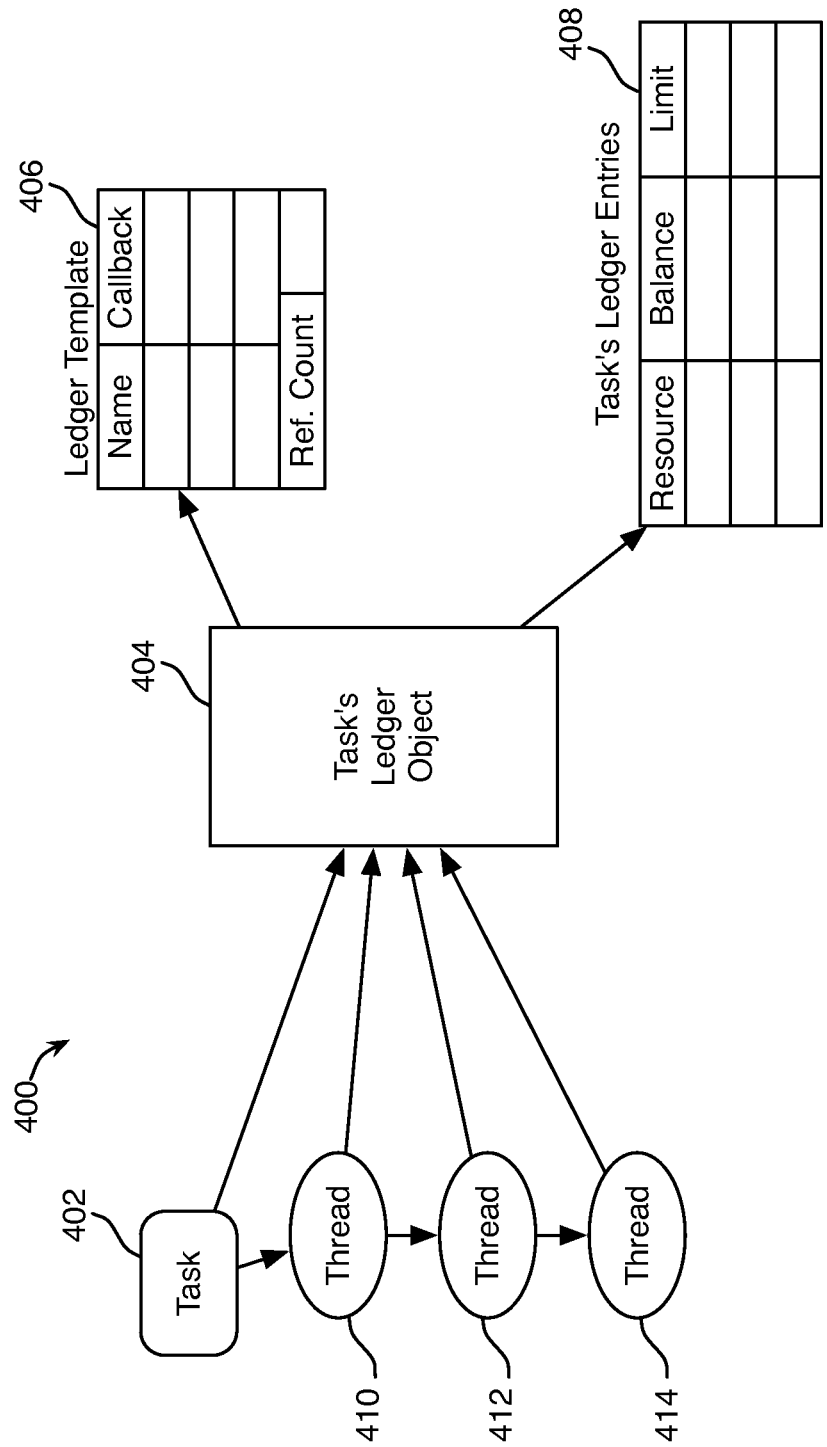
FIG. 4 illustrates an exemplary ledger data structure for tracking resource consumption.

To track the resource consumption balance for the various tasks in the system 200, the ledger module 204 can use a data structure. FIG. 4 illustrates an exemplary data structure 400 for tracking resource consumption. Each task 402 can point to, or be assigned to, a single ledger object 404. In some embodiments, a ledger object 404 can be specific to a task 402. However, the ledger module 204 can also be configured to assign multiple tasks to a single ledger object 404. Furthermore, each thread of a task, such as thread 410, 412, and 414 of task 402 can be assigned to the task's ledger object 404.

Each ledger object 404 can include a variety of information, such as a pointer to a ledger template, a lock, a reference count, a size, and/or a pointer to a ledger entries object. Additional information can also be included in a ledger object. As mentioned, each ledger object can contain a pointer to a ledger template, such as ledger template 406. The ledger template 406 can include an entry for each resource type that is being tracked. For example, a ledger template can include an entry for each of CPU cycles, memory, disk I/O, network I/O, and/or Mach ports. Each entry can be identified by a name. The name can be an arbitrary identifier. For example, when the ledger module 204 registers a resource for tracking, the resource can be assigned the next available identifier number. That is, if the resource is the first resource to be registered, the ledger module 204 can assign the resource the identifier 0. The next resource to register to be tracked can be assigned the identifier 1, and so on. Each entry can also include a reference count. The reference count can be used to track the number of ledger objects that are currently pointing to the ledger template 406. The ledger module 204 can register a new resource for tracking at any time. However, to eliminate the need for locking and error checking, the ledger module 204 can be configured to prohibit the removal of a resource from the ledger template 406. Furthermore, the ledger template can include a pointer to a callback function that is specific to the particular resource.

Figure 5:
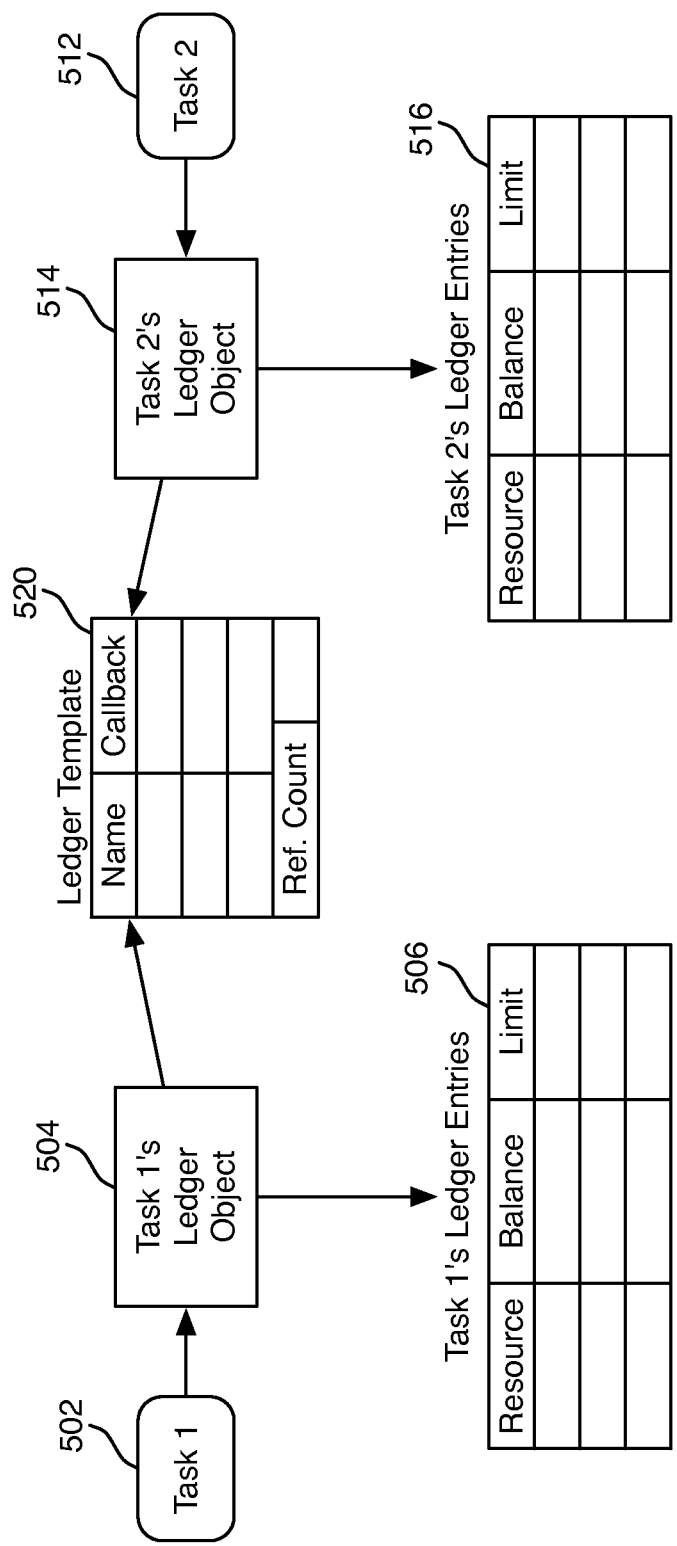
FIG. 5 illustrates an exemplary reuse of the ledger template.

To minimize the memory footprint of the ledger module 204, multiple ledger objects can share a single ledger template that can hold information common to all ledger objects. For example, FIG. 5 illustrates two tasks 502 and 512. Task 1 502 has a single ledger object 504, which includes a pointer to ledger template 520 and a pointer to task 1's ledger entries object 506. Task 2 512 also has a single ledger object 514, which includes a pointer to task 2's ledger entries object 516 and a pointer to the same ledger template as used by task 1 502, ledger template 520.

Referring back to FIG. 4, each ledger object can contain a pointer to a ledger entries object, such as ledger entries object 408. A ledger entries object 408 can be an array of ledger entries. The ledger entries object 408 can also use other data structures to manage ledger entries. Each entry in the entries object 408 can be used to track a task's resource consumption. A ledger entries object 408 can be allocated at the time the task's ledger object 404 is allocated.

The number of entries allocated in a ledger entries object can be based on the number of entries in the ledger template 406 at the time the ledger entries object is allocated. For example, if the ledger module 204 has registered two resources to be tracked, the ledger template 406 will include two entries. Therefore, the ledger entries object 408 will include 2 entries—one for each resource registered. Furthermore, the number of entries in the ledger entries object 408 can remain constant. That is, if the ledger module 204 registers a new resource to be tracked after the ledger entries object 408 is allocated, the newly registered resource will not be tracked.

Each entry in the ledger entries object 408 can contain a record of the resources consumed and a limit. In some cases, the resources consumed and limit values have no inherent units associated with them. That is, the meaning of the values can be defined to be specific to the particular resource. For example, for CPU usage, the values can be recorded in nanoseconds. In another example, for memory usage, the values can be recorded in bytes. In some configurations, an entry in the ledger entries object 408 can be a declining entry type. A declining entry type can include a single value representing the current resource consumption level, e.g. the balance.

Figure 6:
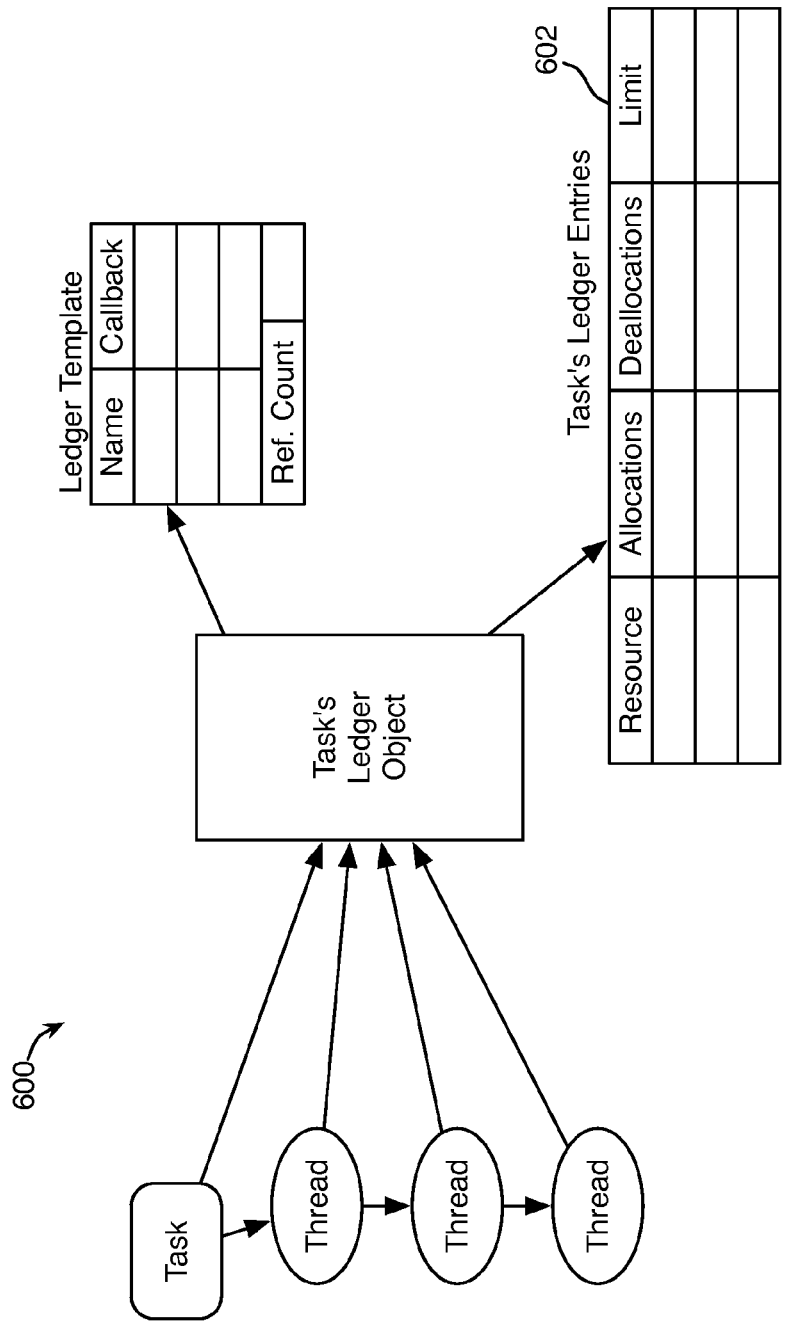
FIG. 6 illustrates an exemplary ledger data structure for tracking resource consumption that uses a double-entry entry type in a ledger entries object.

Alternatively, an entry in the ledger entries object can be a double-entry entry type. A double-entry entry type can track allocations and deallocations independently. For example, FIG. 6 illustrates an exemplary data structure 600 for tracking resource consumption that uses a double-entry entry type in a ledger entries object. Ledger entries object 602 includes a record for allocations and a separate record for deallocations. When using the double-entry entry type, the ledger module 204 can calculate an entry's balance on demand using the allocation and deallocation values. Therefore, the ledger entries object 602 does not need to maintain a separate record for the balance. However, a ledger entries object using a double-entry entry type can maintain a separate record of the current resource consumption level, e.g. a balance. By using a double-entry entry type, the ledger module 204 can track rates of allocation and deallocation, as well as the current balance. An advantage of tracking allocation and deallocation separately is that the ledger module 204 can detect a case where a resource limit was exceeded temporarily, such as if a thread allocates and frees memory in close succession. An additional advantage of tracking allocations and deallocations separately is that if needed, the rate of allocations can be monitored without interference from the deallocations.

Figure 7A:
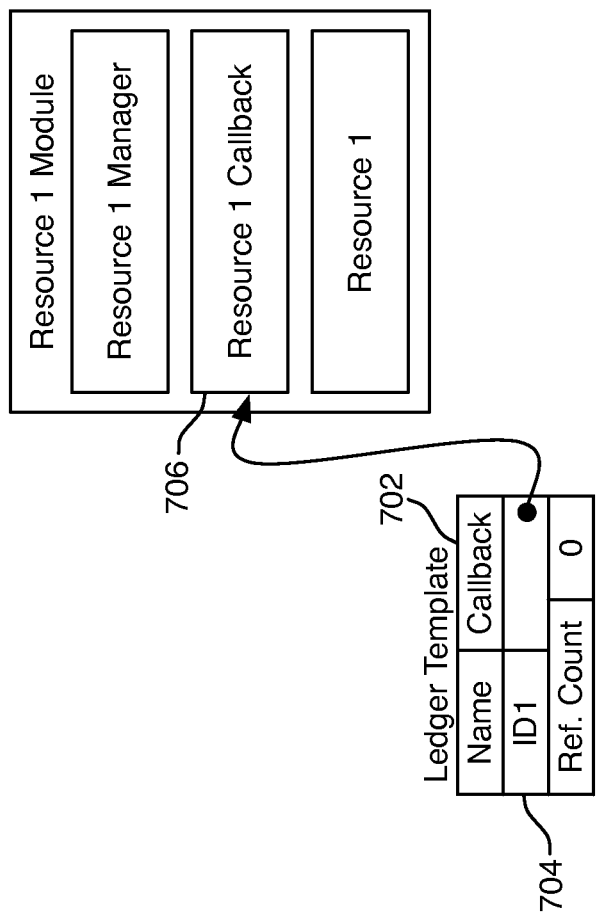
FIG. 7A illustrates an exemplary registering of a resource.
Figure 7B:
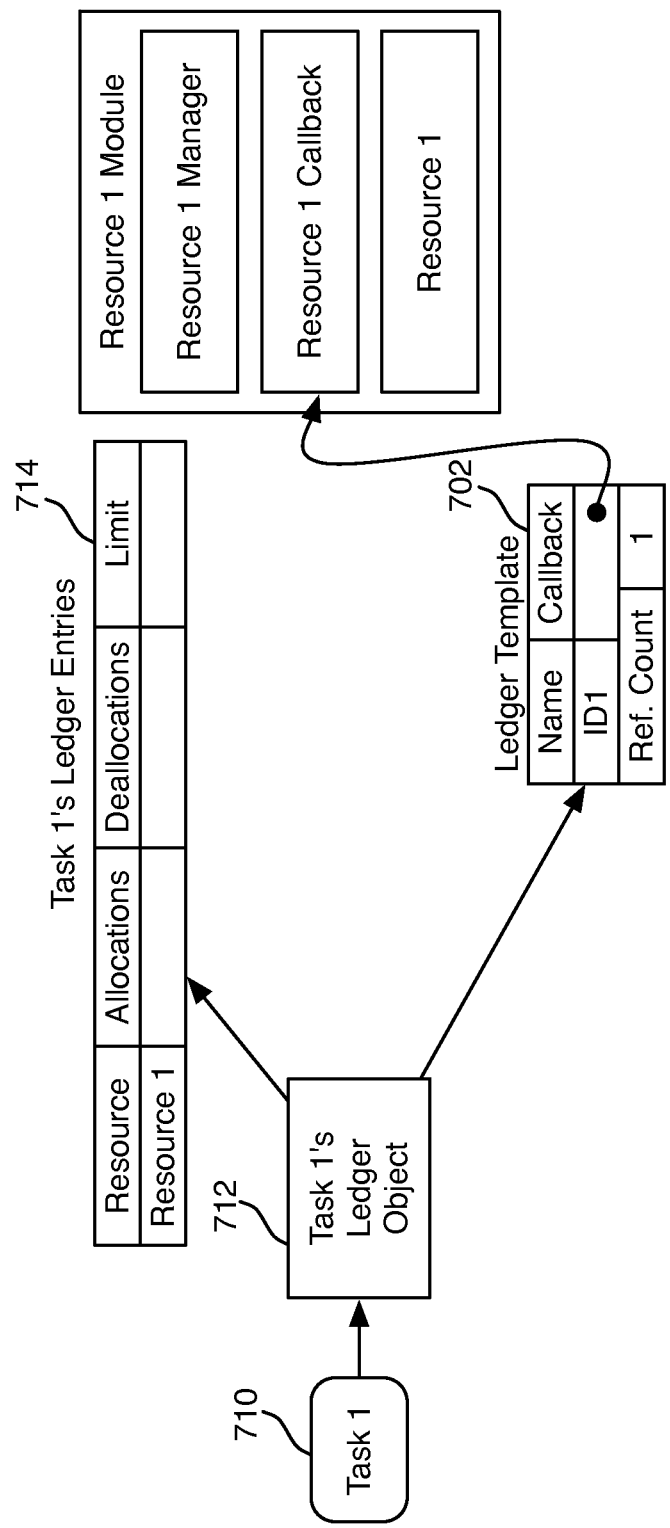
FIG. 7B illustrates an exemplary creation of a task and associated ledger objects.
Figure 7C:
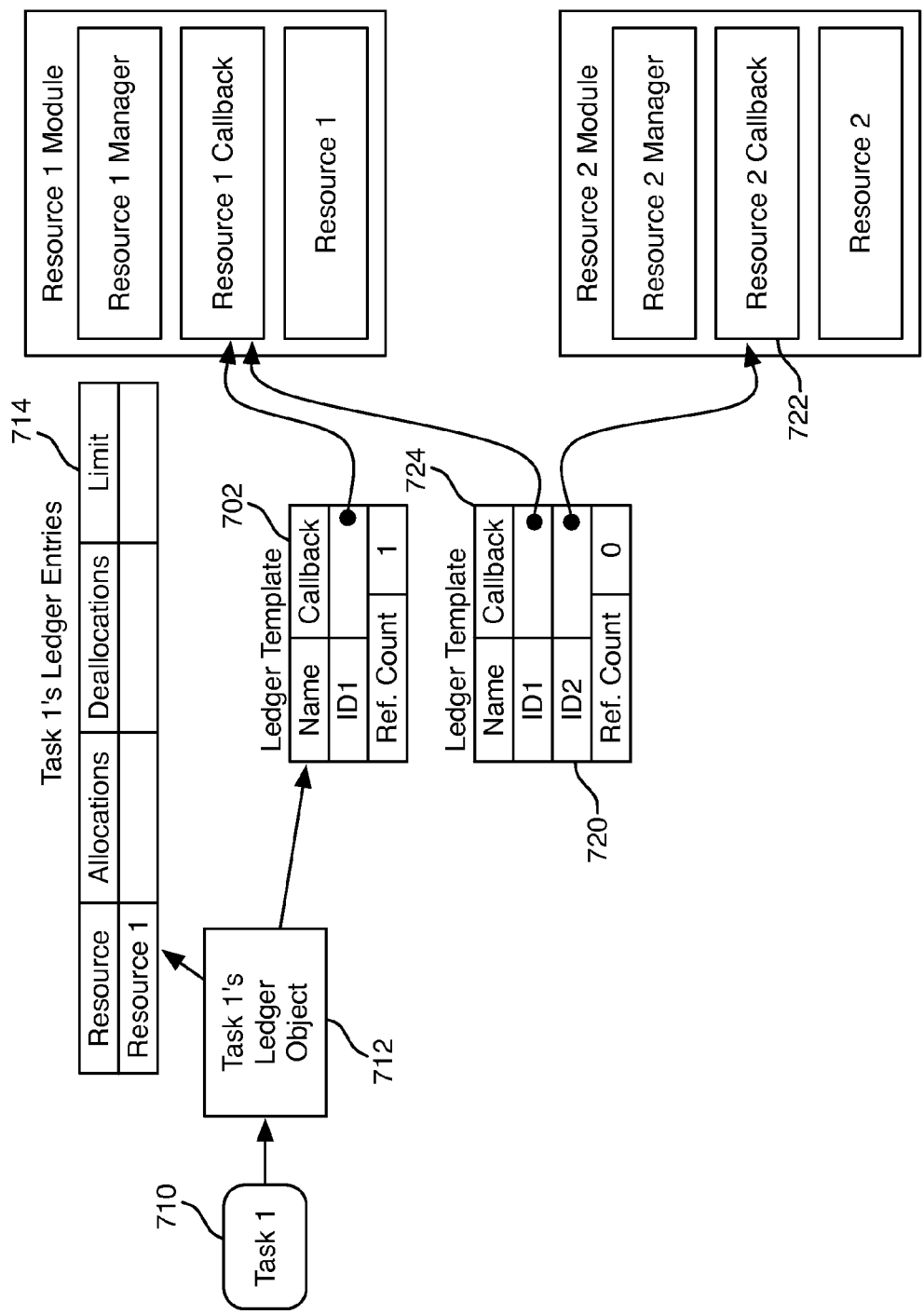
FIG. 7C illustrates an exemplary registering of a second resource.
Figure 7D:
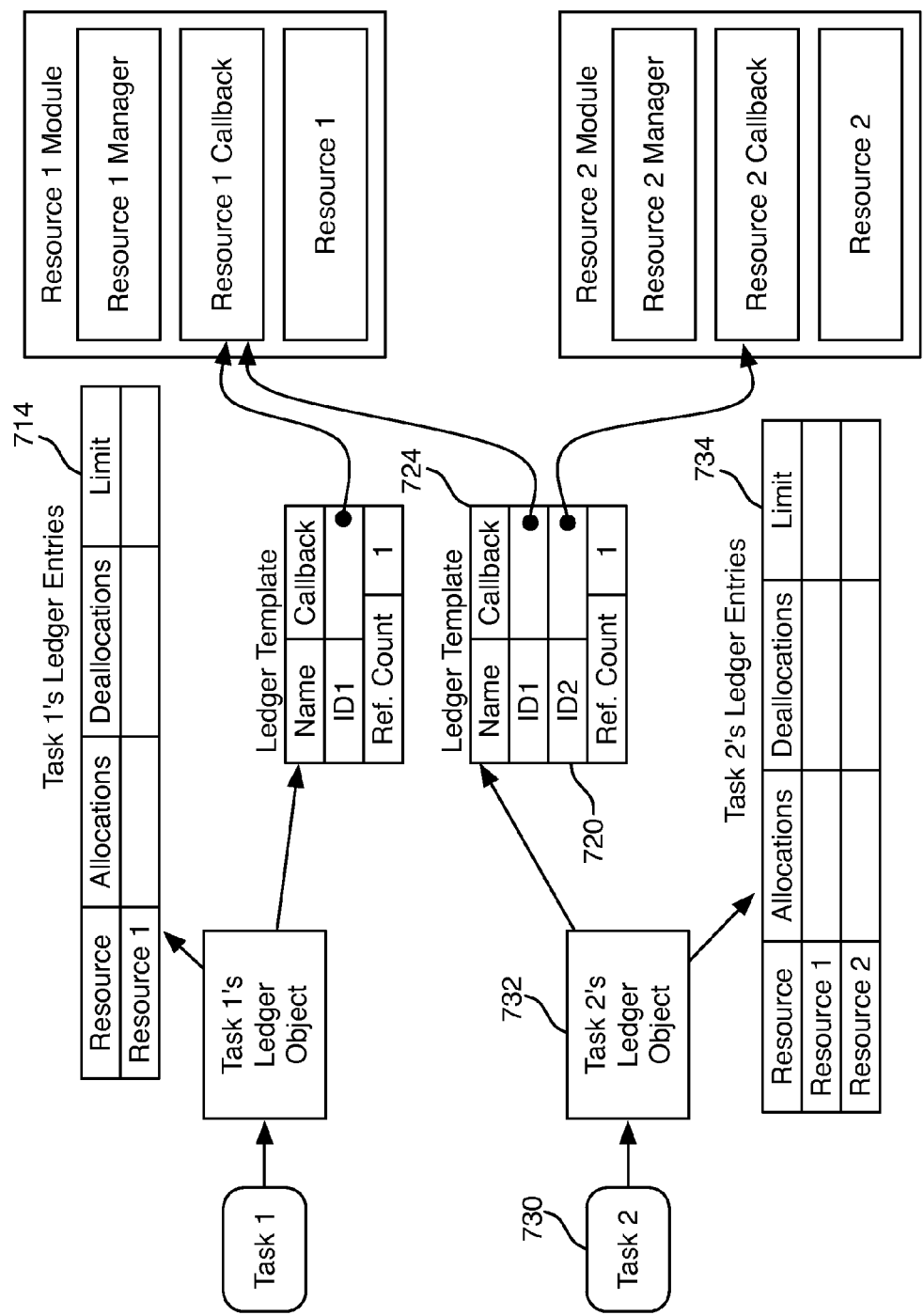
FIG. 7D illustrates an exemplary creation of a second task and associated ledger objects.

FIGS. 7A-7D illustrate the allocation of two different ledger entries objects. In FIG. 7A, the ledger module 204 has registered a single resource, resource 1, for tracking. Therefore, ledger template 702 contains a single entry 704. The entry 704 includes an identifier for the resource and a pointer to resource 1's callback function 706. At some point, as illustrated in FIG. 7B, task 1 710 is created along with task 1's ledger object 712. At the time that task 1's ledger entries object 714 is created, the ledger template 702 contains a single entry. Therefore, task 1's ledger entries object 714 contains a single entry as well. As illustrated in FIG. 7C, after the creation of task 1 710, the ledger module 204 registers a new resource, resource 2, for tracking. Upon registration of resource 2, the ledger module 204 clones the previous ledger template 702 to create a new ledger template 724 and adds a new entry 720 to the cloned ledger template 724. The new ledger template entry 720 includes a unique identifier for resource 2 and a pointer to resource 2's callback function 722. Even though the ledger module 204 has registered a new resource for tracking, task 1's ledger object 712 still references the previous ledger template 702 and task 1's entries object 714 remains a constant size and is not updated to include an entry for the new resource. However, as illustrated in FIG. 7D, when task 2 730 is created, task 2's ledger object 732 points to a ledger entries object 734 with two entries, which is a greater number of entries than in task 1's ledger entries object 714. This reflects the number of entries in the new ledger template 724 at the time that task 2 was created.

Figure 8A:
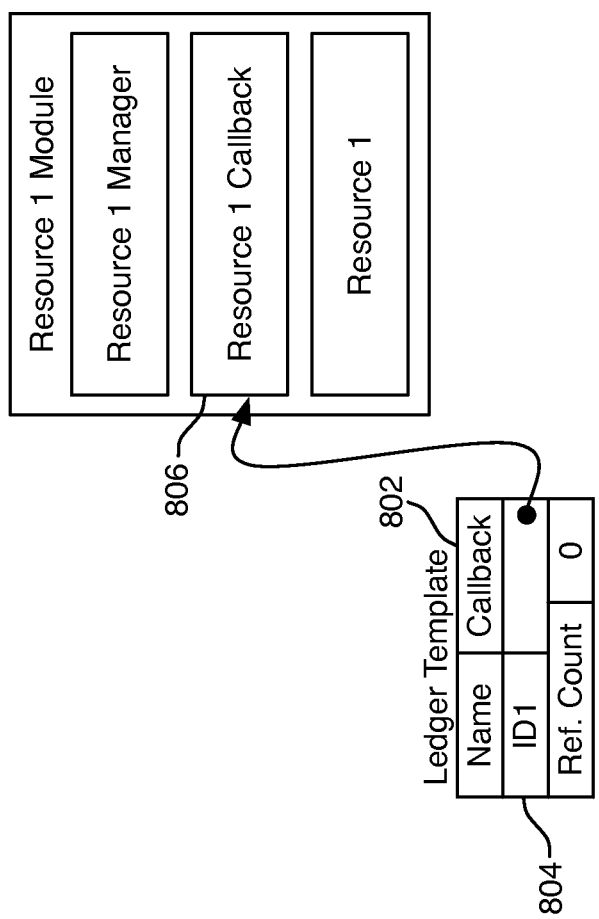
FIG. 8A illustrates an exemplary registering of a resource.
Figure 8B:
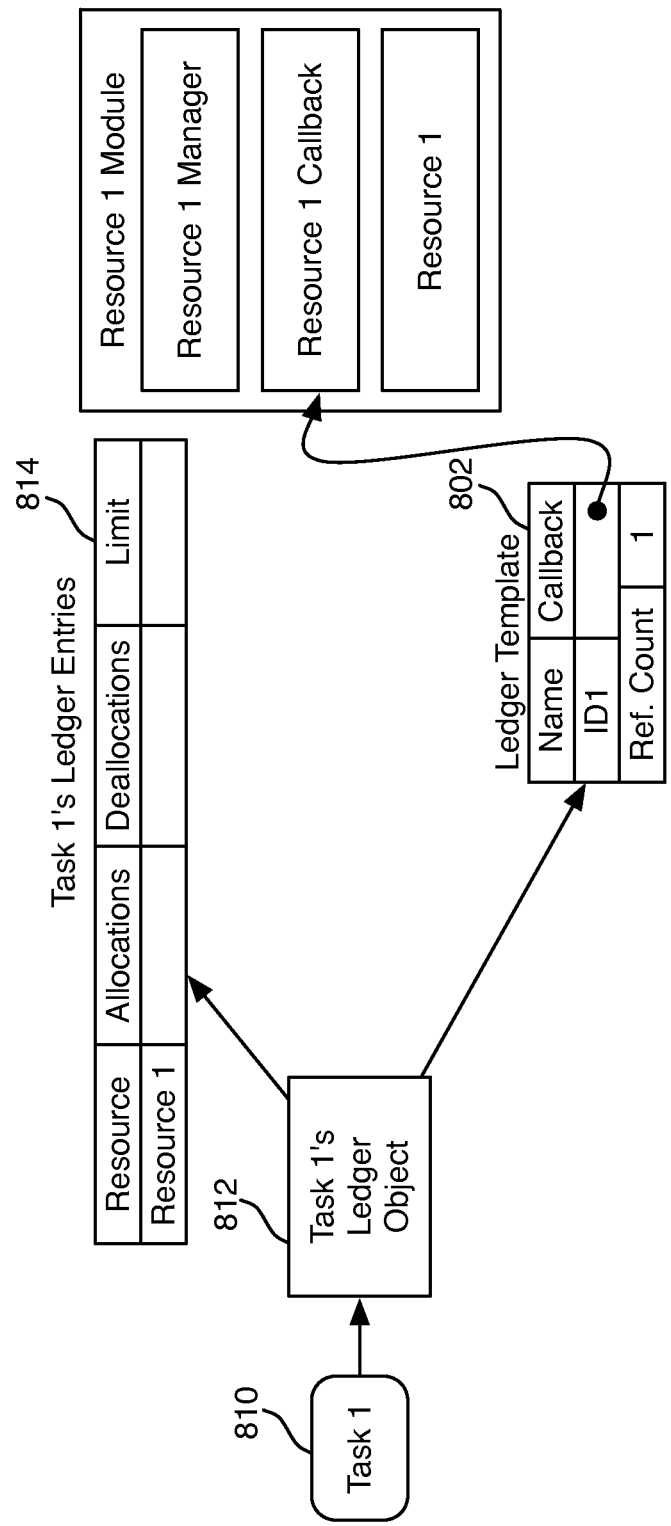
FIG. 8B illustrates an exemplary creation of a task and associated ledger objects.
Figure 8C:
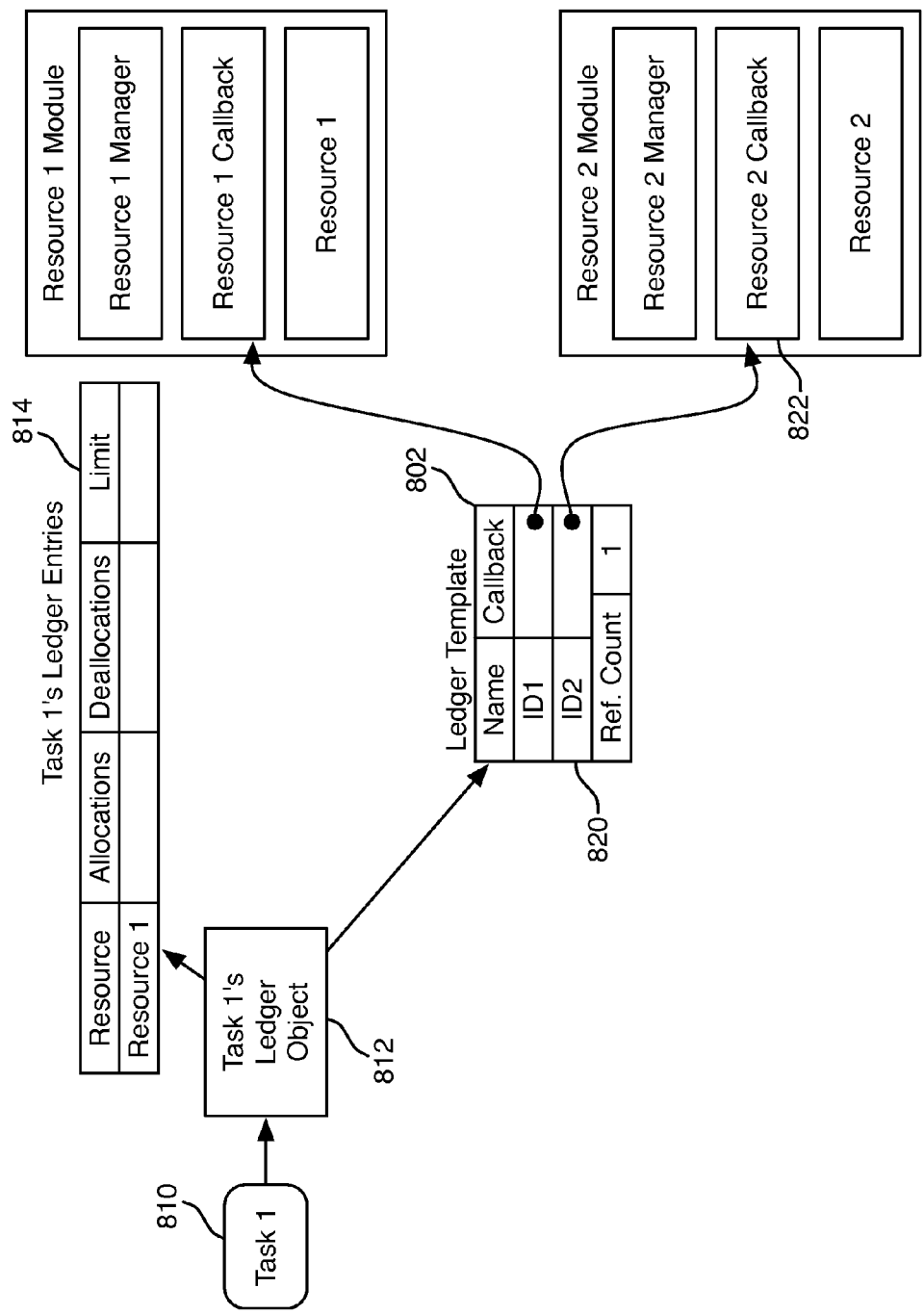
FIG. 8C illustrates an exemplary registering of a second resource.
Figure 8D:
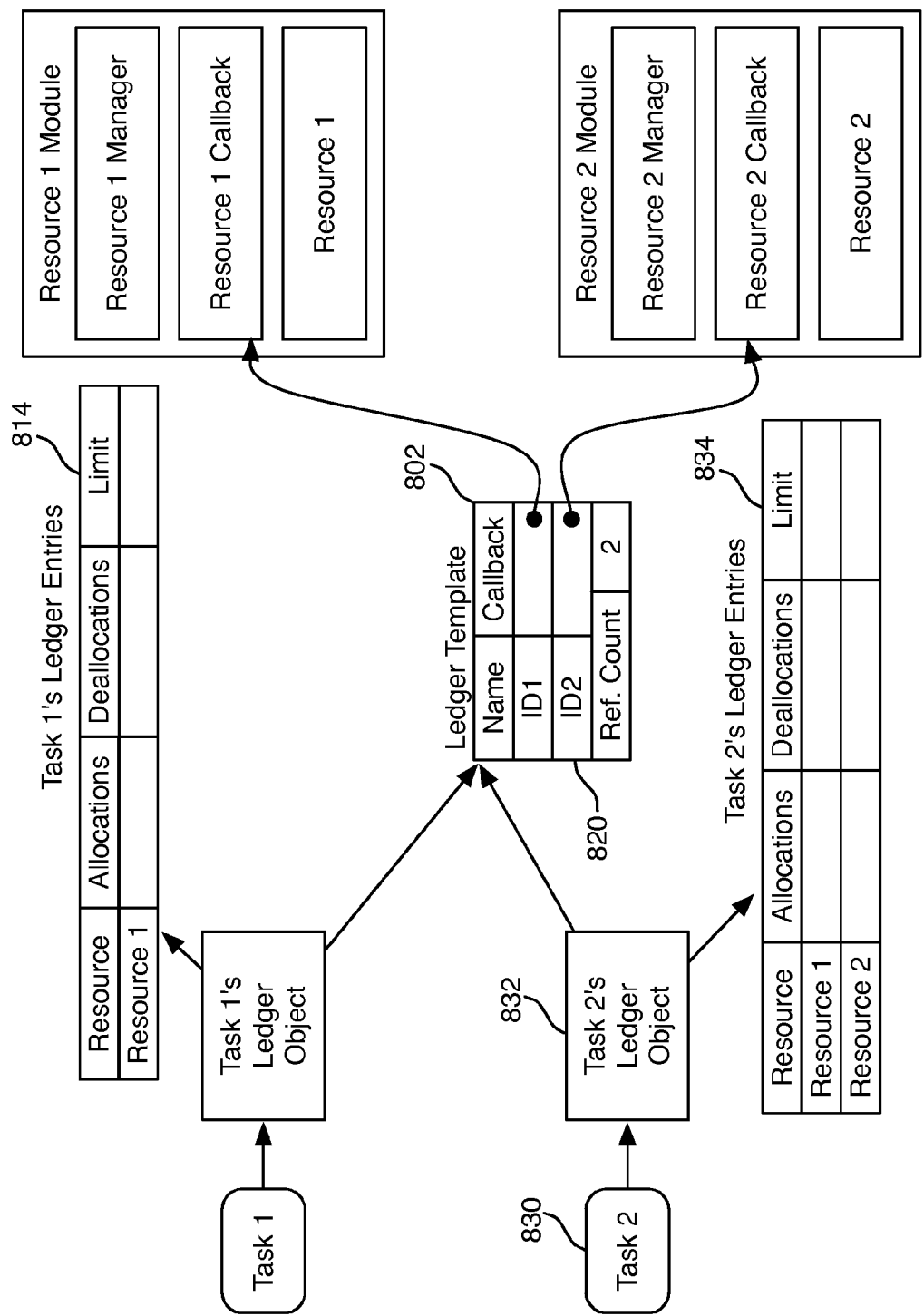
FIG. 8D illustrates an exemplary creation of a second task and associated ledger objects.

FIGS. 8A-8D illustrate an alternate allocation of two different ledger entries objects. In FIG. 8A, the ledger module 204 has registered a single resource, resource 1, for tracking. Therefore, ledger template 802 contains a single entry 804. The entry 804 includes an identifier for the resource and a pointer to resource 1's callback function 806. At some point, as illustrated in FIG. 8B, task 1 810 is created along with task 1's ledger object 812. At the time that task 1's ledger entries object 814 is created, the ledger template 802 contains a single entry. Therefore, task 1's ledger entries object 814 contains a single entry as well. As illustrated in FIG. 8C, after the creation of task 1 810, the ledger module 204 registers a new resource, resource 2, for tracking. Upon registration of resource 2, the ledger module adds a new entry 820 to the ledger template 802. The new ledger template entry 820 includes a unique identifier for resource 2 and a pointer to resource 2's callback function 622. Even though the ledger module 204 has registered a new resource for tracking, task 1's ledger entries object remains a constant size and is not updated to include an entry for the new resource. However, as illustrated in FIG. 8D, when task 2 830 is created, task 2's ledger object 832 points to a ledger entries object 834 with two entries. This reflects the number of entries in the ledger template 802 at the time that task 2 was created.

As previously described, a resource manager 210 can communicate with the ledger module 204 to request that the ledger module 204 update the resource consumption records. That is, the resource manager 210 can instruct the ledger module 204 to update the allocations, deallocations, and/or balance in an entry of a task's ledger entries object. For example, when a task 202 has requested to consume some memory, the resource manager 210 can call into the ledger module 204 using the function call: thread_ledger_debit(thr, task_ledgers.tkm_private, sz) Likewise, when a task 202 has requested to release some memory, the resource manager 210 can call into the ledger module 204 using the function call: thread_ledger_credit(thr, task_ledgers.tkm_private, sz). The first parameter to each function call can be the thread performing the allocation or deallocation, the second parameter can be an index into the task's ledger entries object entry array, and the third parameter can be the number of bytes to allocate or deallocate. Each of these functions can alter the allocations, deallocations, and/or balance values of an entry in the task's ledger entries object. Another advantage of never removing and/or reusing an entry from the ledger template is that the array index can remain constant. Therefore, the array index can be looked up once, such as at boot time, and can then be cached for later reference.

Each time the ledger module 204 updates the resource consumption records, the entry that is modified can be checked to ensure that the new balance does not exceed a predefined limit. That is, the ledger module 204 can compare the new balance stored in the entry or calculated from the allocation and deallocation values in an entry with the predefined limit value in the entry. For double-entry entry types, the limit value can be either positive or negative. For the declining entry type, the limit can be set to always be zero. If the ledger module 204 detects that the balance has exceeded the predefined limit, the ledger module 204 can set a flag, such as the LEDGER_AST bit in a thread structure. Once the flag is set, no further action is taken and execution continues.

Figure 9:
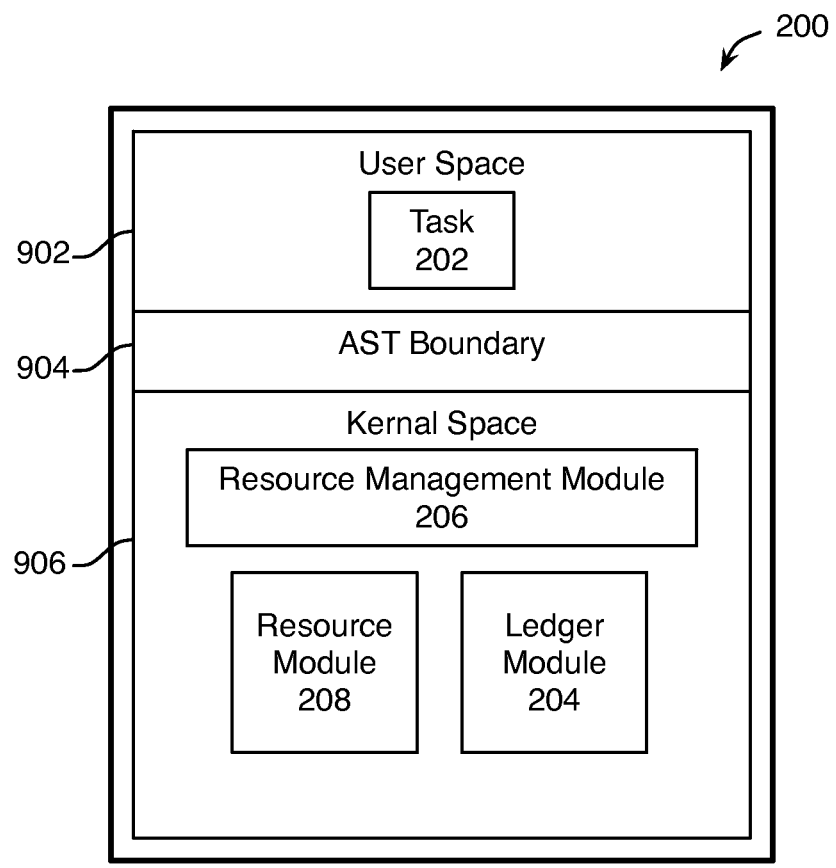
FIG. 9 illustrates an exemplary division of a system into user and kernel space.

FIG. 9 illustrates an exemplary division of system 200 into user and kernel space. The one or more tasks 202 exist in user space 802 while the ledger module 204, the resource management module 206, and the one or more resource modules 208 reside in kernel space 906. Existing in between the user and kernel space is the Asynchronous System Trap (AST) boundary 904. Just prior to returning to user space, a thread associated with a task 202 will pass through the AST boundary 904. When the thread enters the AST boundary 904, it is known that the thread has released all kernel locks and is in a stable, well-understood state. Therefore, this can be an ideal time to perform any blocking actions, such as any actions related to over consumption of resources. While the thread is in the AST boundary 904, the ledger module 204 can check if a flag, such as the LEDGER_AST flag, was set at any time while in kernel mode. If so, the ledger module 204 can check each entry in the task's ledger entries object to see which resource balance exceeds the predefined limit. In some cases, multiple resource constraints can be exceeded in a single visit into the kernel. That is, the task could have made resource requests for multiple different types of resources while in kernel space 906 and two or more of those resources could have been over consumed. By checking each entry in the ledger entries object, multiple violations can be detected and handled.

When the ledger module 204 detects that a limit has been exceeded, the ledger module 204 can call the associated callback function referenced in the ledger template. Each callback function can be specific to a particular resource. Furthermore, each callback function can be defined to react to an over consumption of the resource in a manner that is appropriate for that particular resource. Therefore, the resource module can manage the limited resource and decide the proper reaction. Additionally, in some configurations, the ledger module 204 can include one or more default actions, such as notify, suspend, and/or kill. In the case of an entry of the declining entry type, a default action can be a refill action. That is, the expectation is that resources are always being consumed from a declining entry type entry, and thus the balance can be periodically refilled by the system. Therefore, if an allocation reduces an entry's balance below zero, the thread can be blocked while the ledger module 204 refills the resource. The refill value and refill rate can be defined to be specific to the particular resource.

Figure 10:
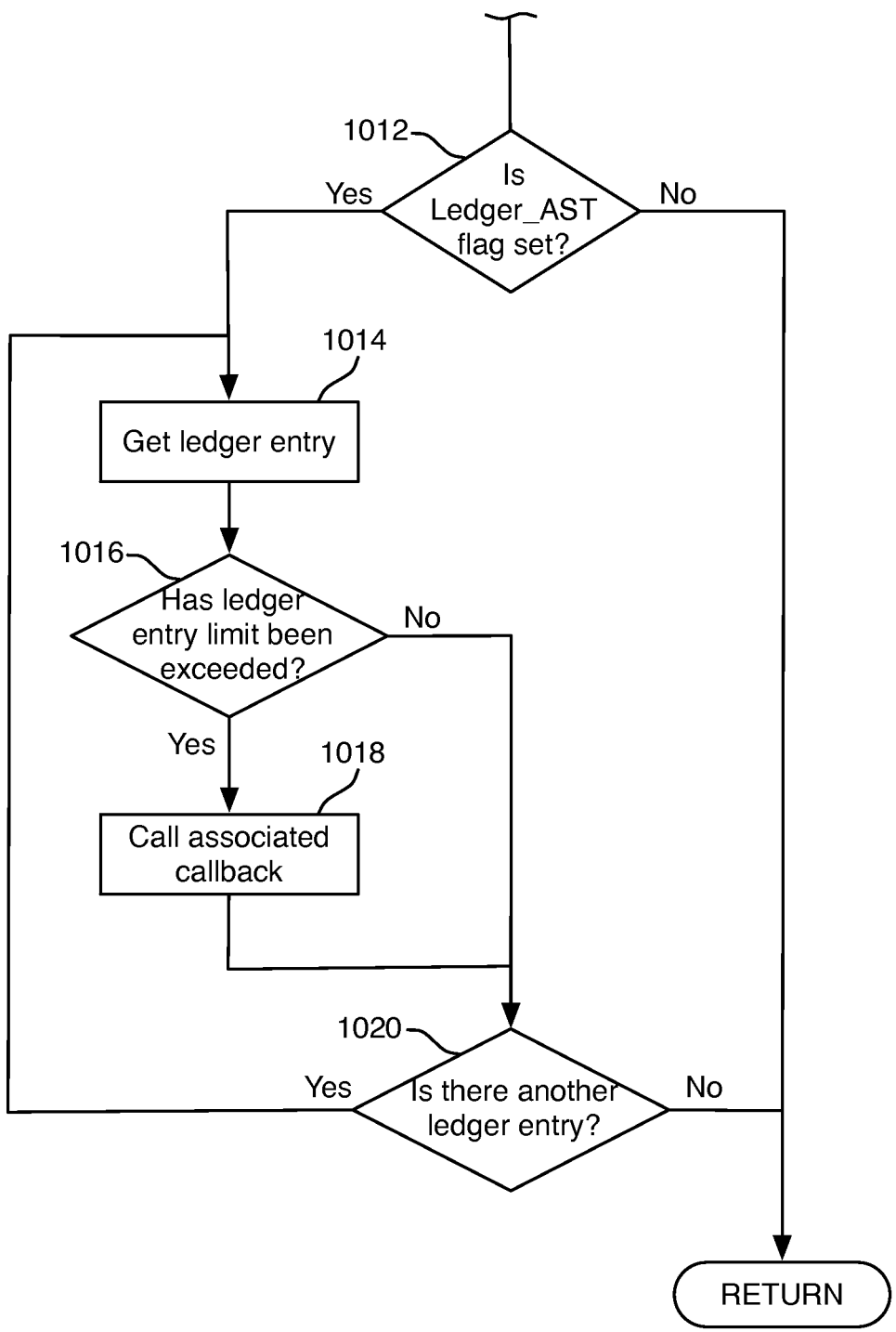
FIG. 10 illustrates an exemplary method embodiment.

FIG. 10 is a flowchart illustrating an exemplary method 1000 for tracking and managing resource consumption. For the sake of clarity, this method is discussed in terms of an exemplary system such as is shown in FIG. 2. Although specific steps are shown in FIG. 10, in other embodiments a method can have more or less steps than shown. The resource consumption tracking and management can begin when the system 200 receives a resource request from a task (1002). The request can be an allocation and/or a deallocation request. In response to receiving the request, the system 200 can update an entry associated with the resource in the task's ledger entry object (1004). For example, in response to an allocation request, the system 200 can increase the overall balance and/or update the allocation specific value. Likewise, in response to a deallocation request, the system 200 can decrease the overall balance and/or update the deallocation specific value. In the case of a double-entry entry type, the system 200 can also calculate the current balance to obtain an updated balance.

After updating the balance, the system 200 can check if the balance exceeds a predefined limit (1006). If the consumption limit has been exceeded, the system 200 can set a flag, such as a LEDGER_AST flag (1008). After setting the flag or if the consumption limit was not exceeded, the system can check if the thread has reached the AST boundary (1010). If the AST boundary has not been reached, the system 200 can resume processing resource requests (1002).

If the system 200 detects that the task's thread has reached the AST boundary, the system 200 can check if the LEDGER_AST flag is set (1012). If not, execution can continue to user space without further action. However, if the LEDGER_AST flag is set, the system 200 can obtain an entry from the ledger entries object (1014) and check if the entry's consumption limit has been exceeded (1016). If the consumption limit has been exceeded, the system 200 can call the associated callback function (1018), which can cause the system to react to the over consumption in a resource specific way. After calling the callback or if the limit was not exceeded, the system 200 can check if there are additional entries in the ledger entries object (1020). If so, the system 200 can continue processing the entries at step 1014. After completing step 1012 or 1020, the system 200 can resume previous processing, which can include repeating method 1000.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A non-transitory computer-readable storage media storing instructions which, when executed by a computing device, causes the computing device to perform steps comprising:
    receiving, at a processor, a resource request from a task, the task associated with a resource tracking object including:
        (i) a reference to a template including an entry identifying the task and a pointer to a callback function, wherein the callback function is specific to the resource requested, and
        (ii) an entries object including an entry for the resource requested with a corresponding balance of current resources consumed and a corresponding predefined resource limit of the resource requested, wherein values of the balance and the limit are defined specific to the resource;
    registering, at the processor, the resource for tracking in the template; and
    updating, at the processor, the balance of resources consumed, wherein the updating comprises comparing the balance of resources consumed against the predefined resource limit, and setting a flag when the balance exceeds the predefined resource limit.

2. The non-transitory computer-readable storage media of claim 1, further comprising:
    in response to detecting, at the processor, prior to returning the task to user space, that the flag is set, calling a first callback function associated with a first resource entry in the entries object, wherein a first balance associated with the first resource entry exceeds a first predefined limit associated with the first resource entry.

3. The non-transitory computer-readable storage media of claim 2, further comprising:
    identifying, at the processor, a second resource entry in the entries object, wherein a second balance associated with the second resource entry exceeds a second predefined limit associated with the second resource entry; and
    calling, at the processor, a second callback function associated with the second resource entry.

4. The non-transitory computer-readable storage media of claim 2, wherein detecting that the flag is set occurs in response to detecting that execution of the task has reached an Asynchronous System Trap boundary.

5. The non-transitory computer-readable storage media of claim 1, further comprising:
    registering a second resource, the registering comprising cloning the template to create a second template and adding a new entry to the second template for the second resource.

6. The non-transitory computer-readable storage media of claim 5, wherein the new entry comprises a unique resource identifier and a reference to a callback function.

7. The non-transitory computer-readable storage media of claim 1, further comprising:
    identifying, at the processor, a second resource entry in the entries object, wherein a second balance associated with the second resource entry exceeds a second predefined limit associated with the second resource entry; and
    calling, at the processor, a second callback function associated with the second resource entry.

8. The non-transitory computer-readable storage media of claim 1, further comprising:
    allocating the resource tracking object associated with the task prior to processing an initial request for a resource from the task, the allocating including allocating an entries object with a number of entries corresponding to a current number of entries in the template.

9. The non-transitory computer-readable storage media of claim 1, wherein the entries object comprises at least one entry and the at least one entry is of a double-entry type.

10. The non-transitory computer-readable storage media of claim 1, wherein the entries object comprises at least one entry and the at least one entry is of a declining entry type.

11. The non-transitory computer-readable storage media of claim 1, wherein the balance is calculated on demand.

12. The non-transitory computer-readable storage media of claim 1, wherein the template is referenced by a plurality of resource tracking objects.

13. The non-transitory computer-readable storage media of claim 1, further comprising:
    the task including one or more threads;
    the threads being associated with the resource tracking object.

14. The non-transitory computer-readable storage media of claim 1, further comprising:
    prohibiting the removal of the resource from the template.

15. The non-transitory computer-readable storage media of claim 1, wherein the resource request is a request to allocate or deallocate the resource and performing the resource request includes allocating or deallocating the resource.

16. The non-transitory computer-readable storage media of claim 1, wherein the resource is at least one of CPU cycles, memory, disk I/O, network I/O, or Mach ports.

17. A system comprising:
a processor;
a task associated with a resource tracking object;
the resource tracking object including:
   (i) a reference to a template, the template including an entry identifying the task and a pointer to a callback function, wherein the callback function is specific to a resource requested, and
   (ii) an entries object including an entry for the resource requested with a corresponding balance of current resources consumed and a corresponding predefined resource limit of the resource requested, wherein values of the balance and the limit are defined specific to the resource;
the processor receiving the resource request from the task; and
the processor updating the balance of resources consumed related to the task, wherein the updating comprises setting a flag when the resource consumption balance exceeds the predefined resource limit.

18. A computer-implemented method comprising:
receiving, at a processor, a resource request from a task, the task associated with a resource tracking object including:
   (i) a reference to a template including an entry identifying the task and a pointer to a callback function, wherein the callback function is specific to the resource requested, and
   (ii) an entries object including an entry for the resource requested with a corresponding balance of current resources consumed and a corresponding predefined resource limit of the resource requested, wherein values of the balance and the limit are defined specific to the resource;
registering, at the processor, the resource for tracking in the template; and
updating, at the processor, the balance of resources consumed, wherein the updating comprises comparing the balance of resources consumed against the predefined resource limit, and setting a flag when the balance exceeds the predefined resource limit.

19. A non-transitory computer-readable storage media storing instructions which, when executed by a computing device, causes the computing device to perform steps comprising:
updating, by a processor, an entry corresponding to a resource in a resource tracking object, the resource tracking object including:
   (i) a reference to a template including an entry identifying a task and a pointer to a callback function, wherein the callback function is specific to the resource, and
   (ii) an entries object including an entry for the resource with a corresponding balance of current resources consumed and a corresponding predefined resource limit of the resource, wherein values of the balance and the limit are defined specific to the resource;
the updating includes recording the balance for the entry specified in a request for the resource from the task, and setting a flag when the balance for the entry exceeds the resource limit defined in the entry;
identifying, by a processor, that the flag is set prior to the task returning to user space; and
calling, by a processor, the callback function specific the resource.

20. The non-transitory computer-readable storage media of claim 19, wherein the callback function is defined to react to an over consumption of the resource in a resource specific manner.

* * * * *